Feb. 26, 1935.                L. DE FOREST                1,992,201
               APPARATUS FOR REPRODUCING SOUND-ON-FILM
                         Filed Oct. 23, 1930
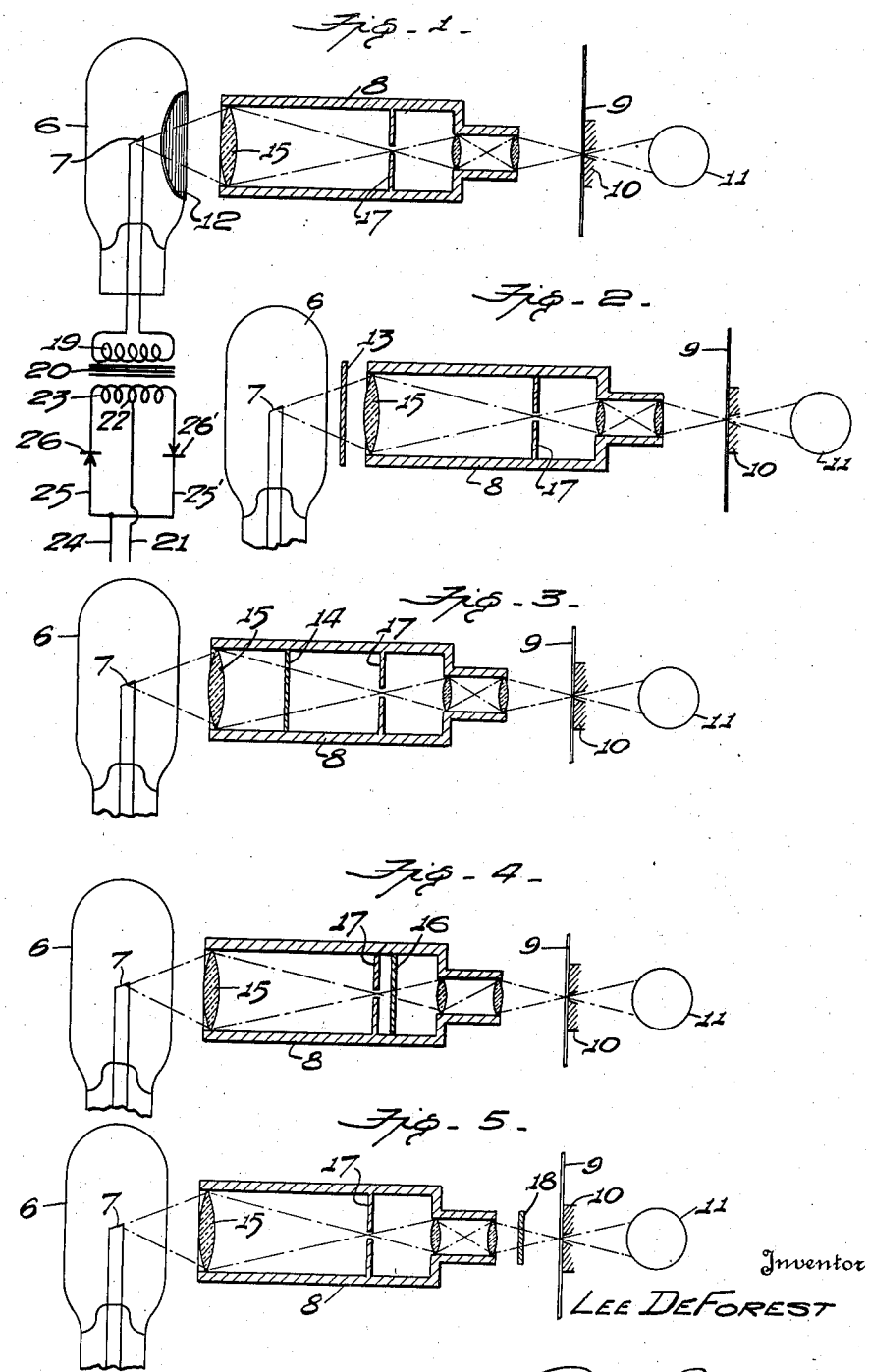
Inventor
LEE DE FOREST
By David Pelton Moore
Attorney Patented Feb. 26, 1935

1,992,201

UNITED STATES PATENT OFFICE 1,992,201

APPARATUS FOR REPRODUCING SOUND-ON-FILM

Lee de Forest, New York, N. Y., assignor to General Talking Pictures Corporation, New York, N. Y., a corporation of Delaware Application October 23, 1930, Serial No. 490,760

2 Claims. (Cl. 179—100.3)

The present invention relates to improvements in apparatus for reproducing sound-on-film, one object of the invention being the provision of means whereby alternating current may be used in the exciter lamp without having any detrimental effect upon the photo electric cell.

Another object of the present invention is the provision of means interposed between the filament of the exciter lamp and the photo electric cell whereby the effect of the fluctuations in the light produced by an alternating current is remedied, and by means of which a time lag is produced and consequently a prolongation of the illumination from the filament so that there is no perceptible fluctuation in the light flow.

It has been found in practise that by placing or inserting so as to intercept the beam of light from an alternating current lamp a screen containing a fluorescent, luminescent or phosphorescent material, which has a well-known time lag, that is, it has a luminosity after the light which has excited it has been cut off or diminished, will continue for a period of time in some cases for a matter of several seconds, and it is therefore my intention to interpose between the exciter lamp and the photo electric cell such a screen.

Still another object of this invention is the provision of a means whereby the frequency from the source of electrical supply may be multiplied or be made higher than originally, so as to reduce the alternating current hum in the exciter lamp in sound reproducing apparatus.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—

Figure 1 is a diagrammatic view showing the screen adjacent the glass envelope of the exciter lamp.

Figure 2 is a similar view showing the screen disposed between the exciter lamp and the adjacent end of the optical system.

Figures 3, 4, and 5 are similar views showing the screen in various other positions relative to the exciter lamp and photo electric cell and by means of which the present invention may be carried into effect.

Referring to Figure 1 of the drawing the numeral 6 designates an exciter lamp having a filament 7 aligned with the optical system 8 and for projecting its beam through the film 9 and through a slit unit 10 to a photo electric cell 11, all of usual construction.

When alternating current is supplied to the filament of the exciter lamp, it is desirable to steady the beam of light so that fluctuations in the current will have no perceptible effect upon the photo electric cell, and in order to accomplish this there is painted or otherwise placed at 12 upon the envelope of the exciter lamp a screen composed of a substance, the luminosity of which has a time lag of sufficient duration to produce in the beam of light originating at the filament 7 and affecting the photo electric cell 11, a continuous, or nearly so, action.

I have found that if this substance is of fluorescent, luminescent, or phosphorescent nature, that this effect will be produced and it is therefore not the intention to limit the present invention to any particular substance.

In Figure 2 of the drawing, the screen 13 is interposed between the exciter lamp and the optical system so that the beam is projected therethrough while in Figure 3 the screen 14 is mounted within the optical system adjacent the first lens 15 thereof or it may be positioned as at 16 within the optical system nearer the forward end thereof or beyond the optical slit forming member 17.

As shown in Figure 5 the screen 18 is positioned between the film 9 and the adjacent end of the optical system but in a position to intercept the beam of light projected from the optical system.

In other words, this present invention is intended to cover the positioning of a screen of this type so as to intercept the beam at any desired portion and to be affected thereby so that the luminosity of the screen will act to produce a time lag in the light beam and thus compensate for the alternating fluctuations at the film and in effect produce a continuous beam for projection upon the film and photo electric cell.

It is well known that when the filament is supplied with a 120 cycle alternating current instead of 60 cycles, that the period of cooling off between the half cycles is reduced to half that at the lower frequencies. I have therefore shown in Figure 1 a simple frequency doubling arrangement. In this instance the filament of the lamp is connected to the secondary 19 of the transformer 20 while one terminal 21 of the alternating current supply is connected to the mid-tap 22 of the primary 23 of the transformer.

The other terminal 24 of the alternating current supply is connected through the two branches 25 and 25' to the outer ends of the primary 23 of the transformer and through the respective rectifying devices 26 and 26'. These rectifying devices are reversed so that one half of the 60 cycle current will pass through one half of the primary of the transformer and the following one half of the 60 cycle current will pass through the other half of the primary of the transformer thus producing a well known frequency doubling circuit in use with the present invention.

The rectifiers here shown may be of cuprous oxide, crystal, tungar or vacuum tube rectifiers or of any desirable type.

It is recognized that the fluorescent screen above set forth will reduce the intensity of the light transmitted, but on the other hand, said screen becomes a source of secondary illumination during the periods when the light from the filament itself is reduced. Therefore, the total light transmitted or thrown upon the film to affect the photo electric cell during a unit period of time is greater than would be the case if a screen or filter of the equivalent opacity, but of non-fluorescent material was inserted in the light path.

What is claimed is:

1. A combination in a sound-on-film apparatus of an alternating current exciter lamp of the filament type, a source of alternating current connected to the filament thereof, a photo electric cell disposed to receive the light rays from the filament of said lamp, an optical system for focussing the light rays from the filament of the lamp upon the photo electric cell, a movable sound-on-film interposed between the optical system and the photo electric cell, and a light permeable secondary illuminating element interposed between the lamp and the optical system, the latter having a self illuminating physical quality in itself.

2. A combination as set forth in claim 1, wherein the secondary illuminating element is composed of a fluorescent, luminescent or phosphorescent material.

LEE DE FOREST.